United States Patent [19]
Martineau

[11] Patent Number: 5,915,226
[45] Date of Patent: Jun. 22, 1999

[54] PREPAID SMART CARD IN A GSM BASED WIRELESS TELEPHONE NETWORK AND METHOD FOR OPERATING PREPAID CARDS

[75] Inventor: Philippe Martineau, Rockville, Md.

[73] Assignee: Gemplus Card International, France

[21] Appl. No.: 08/634,818

[22] Filed: Apr. 19, 1996

[51] Int. Cl.⁶ ...................................................... H04Q 7/20
[52] U.S. Cl. .......................... 455/558; 455/406; 455/407; 455/575; 455/90; 379/144; 379/357
[58] Field of Search ...................... 455/90, 403, 406–411, 455/550, 558, 575; 379/114, 132, 144, 357

[56] References Cited

U.S. PATENT DOCUMENTS

| | | | |
|---|---|---|---|
| 5,615,260 | 3/1997 | Kurgan | 379/144 |
| 5,696,908 | 12/1997 | Muehlberger et al. | 379/114 |
| 5,722,067 | 2/1998 | Fougnies et al. | 379/114 |
| 5,778,313 | 7/1998 | Fougnies | 379/144 |

FOREIGN PATENT DOCUMENTS 2269512   9/1994   United Kingdom .

*Primary Examiner*—Dwayne D. Bost
*Assistant Examiner*—Nay A. Maung
*Attorney, Agent, or Firm*—Roland Plottel

[57] ABSTRACT

The invention provides a prepaid smart card to be used in a wireless telephone network, and methods for prepaying for wireless telephone services, as well as systems for operating a wireless telephone network with prepaid smart cards. The cards, methods and systems permit the use of wireless telephones anonymously, and/or the payment by a user without having a subscription. The invention requires minimal changes to the existing wireless telephone and wireless telephone network, yet provides security against abuse or fraudulent use of the telephone system. Additionally, promotional material may be provided with the prepayments, and persons may prepay into a subscriber's telephone.

26 Claims, 2 Drawing Sheets

PREPAID SMART CARD IN A GSM BASED WIRELESS TELEPHONE NETWORK AND METHOD FOR OPERATING PREPAID CARDS

FIELD OF THE INVENTION

The invention relates generally to prepaid smart cards for the delivery of goods/services, and to the use of such prepaid smart cards with subscriber identity modules, and which, for example, may find particular application in cellular or wireless telephone networks.

BACKGROUND OF THE INVENTION

The invention is a method and apparatus and will be described as applied to a cellular or wireless telephone and network of the GSM type. It should be understood however that the invention is not limited to such GSM cellular wireless network nor to telephones, but may find application elsewhere, wherever there is provision of services and/or goods which are paid for with prepaid smart cards.

Smart cards or electronic chip cards are usually the size of a conventional credit card and have six or eight electrical contacts on one face and include inside an integrated circuit with memory and may include a microprocessors. Data and programs for manipulating the data and communicating outside the card are included in the integrated circuit. In the past the prepaid cards have been widely used in the purchase of telephone service, particularly in France and Germany, where public pay telephones accept the cards instead of coins. Typically the cards are purchased at the post office for a specific amount. The cards are inserted in a public pay telephone, connection is made to the contacts and units of value are removed from the card as the telephone call progresses. The mechanical and electrical specifications of the cards is standardized and one set of standards is published by the ANSI (American National Standards Institute), 11 West 42 Street, New York, N.Y. 10036 under the title "Identification cards-Integrated circuit(s) cards with contacts" ISO 7816-1 and ISO 7816-2.

Smart cards have been manufactured and are commercially available from several companies including those of applicant's assignee, GEMPLUS Card International, Avenue du Pic de Bertagne, Parc d'activites de la Plaine de Jouques, 13420 Gemenos, France.

Cellular wireless networks are widely spread across the globe today. These networks are built to one of a few technical standards, which are GSM, DCS 1800, and PCS 1900. The present invention is described with reference to GSM but is not limited to GSM. The standards on wireless networks may be obtained from ANSI. Particularly attention is directed to standard ETSI/GSM 11.11. Those wishing additional information on cellular wireless telephone and operation are referred to a number of books in the field, for example Mouly, Michel and Pautet, Marie-Bernadette, *The GSM System of Mobile Communications*, 1993, Loissoy-les-Chateaux, France, Europe Media Duplication S.A.; or Clayton, Michael, *GSM Global System for Mobile Communications* (1992), North Sidney, Australia, Security Domain Pty Limited.

These cellular technologies today have some of the latest techniques. In most cellular wireless networks there is a subscriber identity module, SIM, which is in the handset. It identifies the subscription to the cellular wireless network. In some cellular telephones, the SIM is permanently installed in the telephone; but in more modern equipment it is removable and is mounted in a smart card.

The advantage of a removable SIM mounted in a smart card is that a subscriber may carry his SIM with him and insert it in any cellular telephone which will accept the smart card. This permits him both to use the card and to be billed on his home number.

In order to subscribe, one needs to pass a credit check. As a result, only credit worthy people can get wireless service. The networks do not address the market segment of "credit challenged" people who cannot prove that they are reliable enough to be treated as a regular subscriber.

GSM based networks rely on a subscriber number called an International Mobile Subscriber Identity, IMSI, that is to be attached to an individual. Thus, anonymous subscribers cannot be offered services since they need to be identified first, and then attached to a unique IMSI. In GSM based networks, the IMSI number is stored in the SIM card. When inserted into the handset, the SIM provides to the network information about the subscriber that is necessary for establishing a call and for billing of the call.

Because of this arrangement those potential customers who cannot qualify as subscribers do not get any service. Based on today's analog subscription rate, then 40%–50% of people applying for subscriptions have been denied credit and thus denied service.

Depending on the country and also depending on the distribution method in that country, the problem can get more serious. In Europe, for example, the subscription process occurs at the point of sale. If the credit check at the point of sale is negative, then the user will be refused service without having to purchase any goods. However, in North America an individual can buy a "ready to go" package in many different consumer stores, such as Radio Shack or Wal Mart without having to sign any contract at the time of purchase. The subscription process is done over-the-air later, usually at home. Consequently, the potential user can spend a few hundred dollars, e.g. $200, for a package that he is not guaranteed to get any service from. And, this is a major problem that has not been solved to date.

OBJECTS OF THE INVENTION

There is definitely a need to address the market segment of the "credit challenged" individuals in a different way than GSM can provide today. There have been several attempts to provide a "prepaid type" of service over GSM. But, none of them truly provides the solution expected by network operators. A first solution is to monitor units from the network, and to bill a prepaid card in the handset in real time. A second solution proposed is to use a service sometimes called "Advice of Charge", AOC, which is more fully defined by GSM 11.11. Both of these solutions have drawbacks. The first solution, prepayment managed from the network, is a viable alternative, but with shortcomings. It is very expensive for the network operator. It requires an Intelligent Networking infrastructure, IN, with Hot Billing, HB, capability, as well as a network capable of on-line tax or rate information. In this prepaid managed system, the user remains attached to a SIM card, and is considered as a subscriber and is managed as such.

The second solution, AOC, provided by GSM was not intended for prepayment type of applications, but more for family usage or rental applications. In AOC, there is always a subscription attached to the account. The "prepaid mode" is not seen from the billing, and is not reflected on the final bill. The subscriber can at any time turn his subscription into a restricted mode when he wants to lend his handset to someone. In this mode, the units are decremented in the card using a network based telephone schedule of charges until all units have been consumed. Although it can be assimilated to prepaid applications, it is never reflected on the subscriber's bill if he remains overall a "credit worthy subscriber". Also, such implementation suffers from a lack of security, and is not intended for prepaid applications initially, and is believed to be subject to probable fraud.

All of the previous GSM systems require the user (or at least the purchaser of a cellular phone) to be identified. There is no such thing as an anonymous user of a cellular telephone. An object of the present invention is to provide a cellular telephone which may be used completely anonymously.

A further object of the invention is to provide a prepaid telephone service, which has enhanced security or, put another way, reduced opportunity for fraudulent use.

An object of the invention is to provide an apparatus, method and smart card which will provide a network of independent prepaid service based on a fixed tariff structure that will be offered to "credit challenged" individuals in the form of a prepaid throw away smart card.

In an alternative embodiment, the smart card may be used continuously in that new prepayment value may be placed in the card. As of today, GSM defines a "Mobile Station", MS, as having a "Mobile Equipment", ME, and a "Subscriber Identify Module", SIM; MS=ME+SIM. Such a combination is mandatory for operating a service. According to an aspect of the invention, the SIM is no longer attached to a subscriber, but will be identified to the network operator as an anonymous prepaid type SIM. Prior to sale of the telephone, such a SIM would be programmed and inserted into the handset. It would be a SIM with restricted capabilities, e.g. 611 calls allowed only. If the purchaser wished to convert his SIM to a traditional subscription to a cellular phone, he could initiate the subscription process, OTA, and the SIM could be turned into a full subscription attached to a user after approval of the user's credit check. In the case of the credit check being unsuccessful, or if the user wished, there would be another card in the package with the cellular telephone with an amount of units already loaded, to be inserted in an additional slot reserved for that purpose in the handset.

Because of that additional card, the user could still benefit from a wireless service without passing the credit check by using the additional card. Once the card was consumed, i.e., all of the units or value of the card had been used in calls, the user could buy another card to continue with the service. This provides the network operator with a secure financial position for such individuals, and provides the user of cellular service who intend to remain anonymous the ability to do so. Tus a one-stop shopping solution is provided for the user who has good credit who wishes to retain traditional service, and for the user who is credit challenged, as well of the vendor of cellular equipment to users.

The concept and implementation as proposed herein opens the door to an untouched area of promotional campaigns wherein a third party could offer cellular air time by mailing prepaid cards as part of the marketing program. It turns the handset into a cellular prepaid phone.

SUMMARY OF THE INVENTION

According to an aspect of the invention, there is provided a method for enabling service from a wireless telephone having a SIM and a prepaid card in the telephone comprising the steps of calculating in the card a certificate as a function of (i) number of prepaid units remaining in the card, (ii) serial number in the card, and (iii) a key number in the card; and transferring from the card to the SIM (i) said number of prepaid units remaining in the card, and (ii) the card's serial number; then calculating in the SIM a number which should be the same as the card key number based on said transferred number of prepaid units remaining in the card and said card serial number; and calculating in the SIM a certificate as a function of said transferred number of prepaid units remaining in the card and said calculated number which should be the same as said key number in the card; then comparing said calculated certificates from said card and from said SIM; and if coincident in said comparison, then enabling said telephone in said network.

According to a further aspect of the invention there is provided an apparatus which automatically performs the steps of the first described method.

According to another aspect of the invention, there is provided a modified prepaid secure smart card which in normal use in a network allows the transfer of goods/services to a user of the card from a network operator by subtracting prepaid units of value stored in said card in exchange for said goods/services. The card is a card-shaped carrier having a terminal, and an integrated circuit embedded in the carrier and connected to said terminal. The integrated circuit includes a serial number register for storing a serial number unique to each card; a prepaid units register for storing a number of units of prepaid value; a switch responsive to interrogation at the terminal to write to the terminal the serial number in the serial number register, and to write to the terminal the number of prepaid units remaining in said units register; a key number register storing a key number, which has a first portion unique for each card, and a second portion which is common to a plurality of cards, and which is unique for a network operator; an algorithm stored in said card, said algorithm in normal use of said card not being readable in said terminal, and a microprocessor for calculating a certificate in accordance with the algorithm as a function of the key number and the number in the prepaid register, and the certificate being readable at the terminal.

According to another aspect of the invention, there is provided an improved subscriber identification module, SIM, for operating with prepaid cards and with a network that provides goods/services via said network. The SIM includes an integrated circuit having an input for receiving from one prepaid card (i) a serial number of said card, (ii) a number of prepaid units remaining in the card, and (iii) a certificate compiled by said card from its serial number, card key number, an algorithm therein, and number of prepaid units remaining in the card; a diversification key which is the same for a plurality of modules of a network; first and second algorithms; a microprocessor for calculating (i) a card key number with the first algorithm as a function of the diversification key, and the receive serial number of the card, and where the calculated card key number should be the same as the key number in said card; and (ii) calculating a certificate with the second algorithm as a function of the calculated card key number, and the received number of prepaid units remaining in the card; and (iii) comparing the calculated certificate with said received certificate, and (iv) if coincidence, generating an enable signal whereby goods/services are provided in accordance with said generated enable signal.

According to a further object of the invention, there are provided integrated circuits of the types first described in the preceeding two paragraphs for use in prepaid smart cards, and for use in SIMs.

These and other objects and features of the invention will become more apparent from the preferred embodiments described with reference to the attached drawings, which are for the purposes of illustration and not limiting of the invention.

DETAILED DESCRIPTION OF THE PREFERRED EMBODIMENTS

Figure 1:
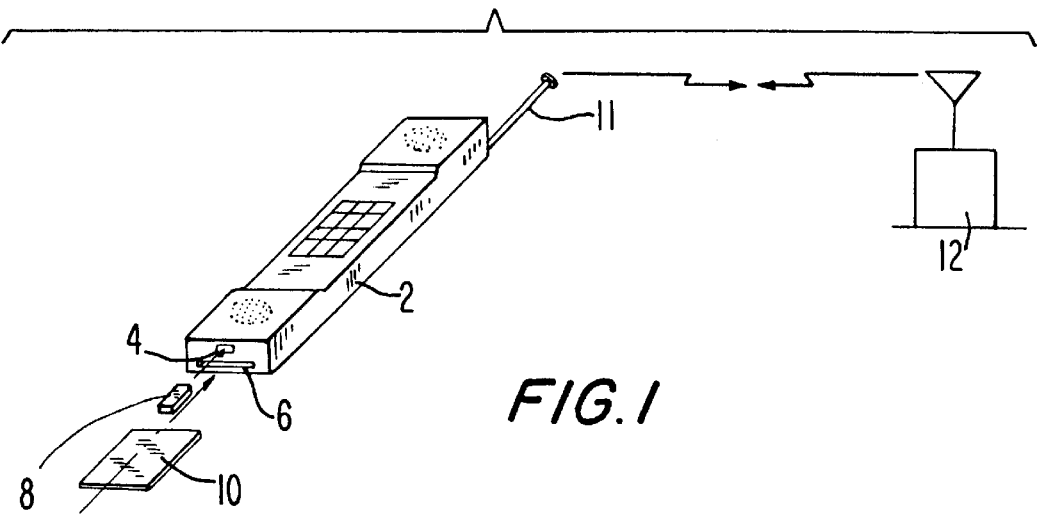
FIG. 1 is a schematic drawing showing a cellular telephone handset and cards of the invention, and a network operator's base station.

FIG. 1 shows a cellular telephone handset 2 having two slots therein 4 and 6. The slot 4 is to receive a removable SIM mounted on a miniatured smart card 8. The slot 6 is to receive a prepaid card 10 which is shown here on a conventional smart card 10, which is to the ISO standard cited above. In operation, the cellular phone 2 communicates through its antenna 11 with a cellular telephone operator's base station 12.

Figure 2:
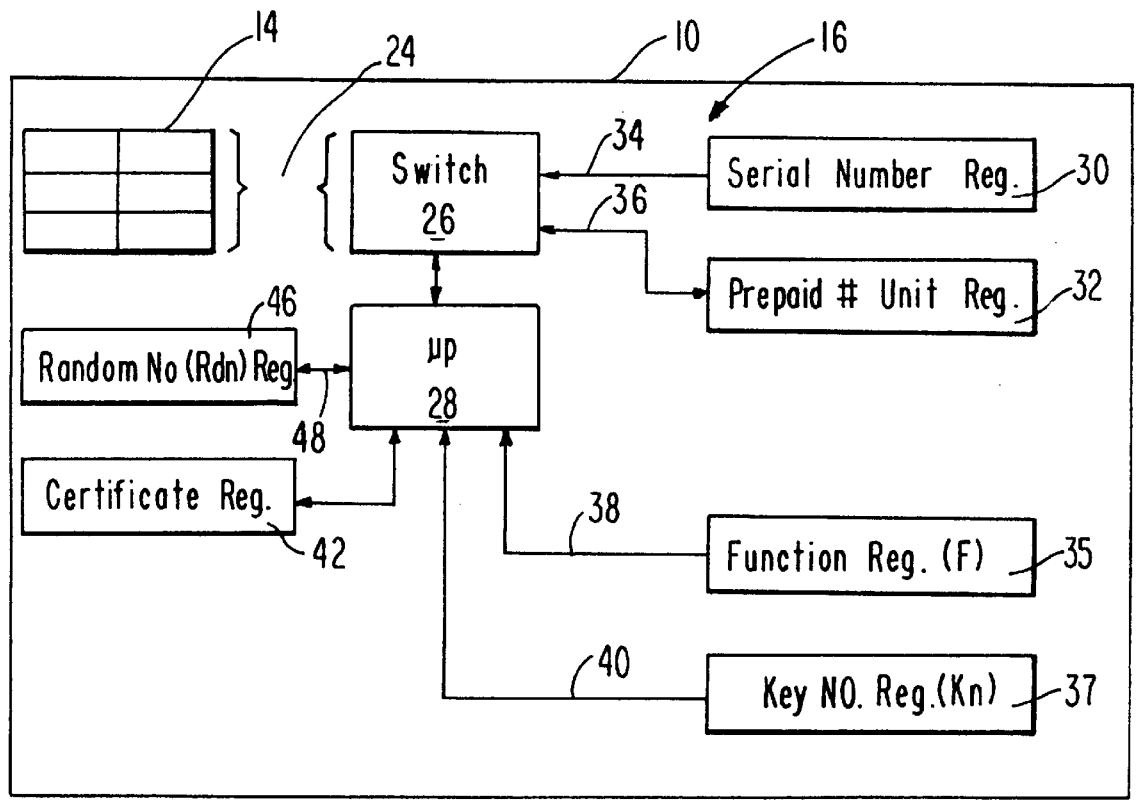
FIG. 2 is a schematic block diagram showing various elements in a prepaid smart card and in an integrated circuit in said prepaid smart card.
Figure 3:
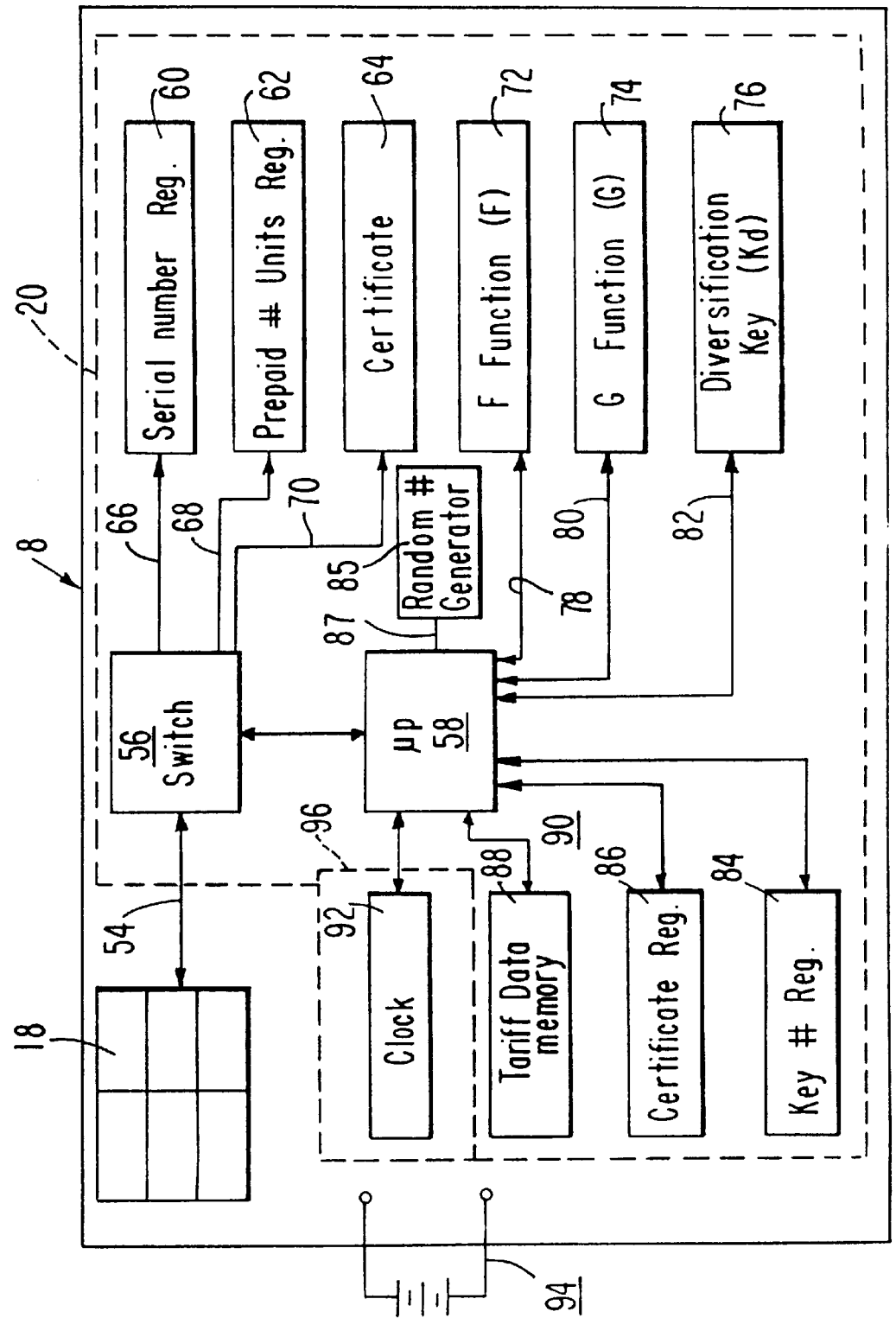
FIG. 3 is a schematic block drawing illustrating various elements in a SIM in a cellular telephone handset.

FIG. 2 is a highly schematic portrayal of the prepaid card 10. The card has six or eight contacts 14 on one face and an electronic circuit embedded in the card which in current manufacturer would be a single integrated circuit 16. The integrated circuit is embedded in the card usually below the contacts 14. According to the ISO standard, the card is 85 millimeters long, 54 millimeters wide, and 1 millimeter thick. The contacts 14 are eight in number, of six as shown in FIGS. 2 and 3 and occupy an overall area of not more than 9.62 mm×9.32 mm. Each contact typically is not less than 1.7×2 mm. The contact area begins typically 10.25 mm from the left edge and 9 mm from the upper edge of the card. The integrated circuit 16 typically is 1 or 2 mm on each side a fraction of a mm thick when mounted on a support. Thus it would be appreciated that the drawing of FIG. 2 is highly schematic.

FIG. 3 is a schematic view of a SIM card 8 as shown in the drawings here as the small physical version smart card with the typical dimensions of 25×15×1 millimeters; with the contact area substantially the same as in the large card. It would be thus appreciated that the drawing of FIG. 3 is highly schematic in its showing of the card 8 with contacts 18 and an integrated circuit 20.

Alternatively, the SIM may be mounted on a full size smart card or may be non-removably mounted in the handset. The slots 4 and 6 have the necessary connectors with contacts for making electrical connection to the contacts 14 and 18 on the cards 8 and 10.

Before describing in detail the FIGS. 2 and 3, let us look at some of the overall operations and structure.

First, no modification to the existing GSM air interface between the handset 2 and the base station 12 is required.

Tax or telephone charge information is computed by the handset during the call. This may be based on a "unit value table", UVT, stored in the SIM. The tax information may be computed on the basis of a flat rate (e.g. using an internal clock of the handset), and for that reason in one embodiment, it will not allow roaming of the networks. Alternatively the tax information may be provided by the network in which care roaming may be permitted. The table in the SIM is updated "Over the Air", OTA, at any time, once the handset has established connection with the network. The OTA update capability offers flexibility in the management of the unit pricing.

The SIM plays the role of a security module that will secure the exchange with the prepaid card. The handset manages the exchange between the two cards and offers full telephone service only if a prepaid card with units left in it is inserted and has been authenticated; or if the "initially restricted" SIM has previously been turned into a "full subscription" SIM. Otherwise it will offer restricted services (611). It is believed that the handset is initially packaged and sold with a initially restricted subscription SIM and a prepaid card. The plug-in SIM is initially restricted. It has a subscription in "fixed dialing number", FDN, mode allowing calls to 611 only. The plug-in SIM is plugged into the handset. The prepaid card is loaded with units representing a value. For example, $10, which for example, represents 50 units of $0.20 each.

The prepaid card 10 has information, which is readable outside of the prepaid card, namely, the number of units remaining in the card, and a serial number of the card. Invisible in the card, i.e. which cannot be taken out of the card, is a function or algorithm, F, and a key for that algorithm, Kn. The algorithm and the key are used by the prepaid card for making certain calculations.

The organization and data flow in one embodiment will now be described and we will need to form on two separate steps. First, an initial session set-up; and then, the decrementation process during a call.

The SIM in the cellular telephone is already active in the network when purchased. However, it is configured in "FDN" with all calls routed to the Customer Care Service center, CCS. If credit is sought and approved, the SIM is updated Over the Air, OTA, and the FDN restriction is turned off. If not, the SIM remains in the restricted mode and no calls can be placed other than customer service or as programmed in the FDN list. At that point, the prepaid card needs to be inserted to get service.

A typical initial session set-up would be as follows.

Before allowing any calls, the prepaid card needs to be authenticated to validate that it is a card really issued by the "Network Operator", NO. This is achieved by matching a "certificate" associated to the number of units claimed by the prepaid card. The SIM and the prepaid card are both inserted in the handset. The SIM is initially programmed with a function F that is the same as the function F in the prepaid card. To verify the certificate, the SIM recomputes the key number Kn. This is done using a diversification key Kd and another secret function G.

Kn=G (Ser.nb, Kd)

In the prepaid card, the certificate is computed by the prepaid card from the number of units left, Xunits, using a formula involving the secret function or algorithm F, which is the same as the function F in the SIM, and a secret key Kn, which is stored in the prepaid card:

Cert=F (Xunits, Kn).

The secret key Kn in the prepaid card is unique for each individual prepaid card.

The handset or SIM causes certain data to be read from the prepaid card to the SIM, namely Xunits, Sernb, and Cert1.

The SIM then computes

Kn=G (Ser.nb, Kd) and using that calculated Kn, then calculates

Cert=F (Xunits, Kn) A comparison is made, and if Cert=Cert1, then the prepaid card is authenticated. If the prepaid card authentication fails, the SIM stays in the FDN mode, and calls remain restricted to the FDN list. If the authentication is successful, the SIM automatically turns off the FDN mode or to a non-restricted mode to offer full network access either for outgoing or for incoming calls.

During the initialization of the call, it is prudent for the SIM to generate a random number to the prepaid card. The certificate generated in the prepaid card is a function that includes the random number, Rdn, i.e.:

Cert=F (Xunits, Kn, Rdn) Similarly, in the SIM, the calculation of the certificate also includes that random number so that the SIM after computing Kn, then calculates Cert=F (Xunits, Kn, Rdn) This avoids the possibility of a tampering with the first unit with a prepaid card.

An alternative approach might be to not include the random number in the first calculation, i.e. in the initialization, but to make the first time period until the prepaid card is decremented very short, i.e. a second or two, and then after that initial short time, to decrement the prepaid card one unit, the decrementation of the card being performed with a random number.

The decrementing of prepaid units during calls involves an exchange between the SIM and prepaid card. Every time a call is placed, the handset starts measuring time using its internal clock, and uses a table stored in the SIM to convert an amount of time into a number of units to decrement. Then, when units have been"decremented in the prepaid card", the process is as follows.

The handset has a SIM with F, Kd, G, random number generator.

The prepaid card in the handset has, Xunits, Ser.nb, F, and Kn.

The handset causes the number of prepaid units remaining in the prepaid card to be passed to the SIM, i.e. Xunits is read into the SIM. The handset asks the SIM to generate a random number Rdn. The SIM generates the random number, Rdn, as a parameter to ensure security, and to avoid someone trying to replay the same sequence. The random number is sent from the SIM to the prepaid card, and a pulse or other signal is sent to the prepaid card to decrement at least one unit, for example n units. In the prepaid card, n units are decremented, so that X left=Xunits−n.

The prepaid card then computes a new certificate, or result, which is based upon the function F Result=F (Xleft, Rdn, Kn)

This is a new certificate, except that the Result includes as a variable the random number just received. The handset then sends back to the SIM the Result and the remaining number of units in the card. The SIM then recomputes the result to verify that the units have been decremented:

Result=F ((Xunit−n), Rdn, Kn)

The Kn, it should be noted, at the SIM is previously computed from the formula Kn=G (Ser.nb, Kd).

If the result computed by the SIM matches the one from the prepaid card, it verifies that units have really been decremented. Thus, the SIM continues to operate normally. If the results as calculated in the SIM and as received from the prepayment card are different, then the SIM turns back to the FDN mode and restricts the cellular phone to the FDN list. This decrement process continues during the call until either the call is terminated, or there are no more units left in the prepaid card.

At the end of each session, when the handset is turned off, the temporary "non-restricted" mode disappears; and at the next session "power on", the SIM will automatically start in the FDN mode. In other words, the telephone is in the restricted or FDN mode when power is first turned on. If the SIM and prepaid card authenticate that there are units in the prepaid card in the initialization of a step, the SIM switches to a non-restricted mode. The telephone remains in the non-restricted mode until there are no more units remaining in the prepaid card, which would usually be due to the certification not matching as each unit is decreased, or if the telephone is powered off and then is powered on.

Some characteristics of the different elements may be noted.

The number of units remaining Xunits in the prepaid card is a variable.

The serial number, Ser.nb, in the card is a fixed number. It is unique to each card. Typically, it is 20 characters in length. The function F in both the prepaid card and the SIM are the same function. It is a coding algorithm and for example of the DES type. DES is a commonly used sophisticated algorithm developed by the U.S. National Bureau of Standards for encrypting and decrypting data. There is the encryptions standard DES, which uses a key. This or any type of convenient or conventional encryption system may be used.

The key number Kn is a fixed number in the prepaid card, and is the key to the function F. It is unique to each card and includes within it at least one character which identifies each network operator. This permits cards of one network operator to be used only in its network.

In the SIM, the secret function G is a fixed algorithm and as the F secret function may be DSQ or any other convenient or conventional type. The diversification key Kd for the secret function G, is the same for all SIMs of that network operator, typically, 16 characters. The Kn is calculated by the SIM from G (Ser.nb, Kd).

Turning now to FIG. 2, there is shown the contacts 14 connected by a bus 24 to the integrated circuit 16. The bus 24 comes into a switch 26 which is operated by a microprocessor 28. The serial number of the card or integrated circuit is stored in serial number register 30. The number of units remaining in the card is stored in a prepaid number of units remaining register 32. The serial number register and prepaid number of units remaining register are shown connected by buses 34 and 36 to the switch 26. This is to indicate that the serial number and number of units remaining may be interrogated from outside the card through the contacts 14. Importantly, the actual arrangement of the switch, microprocessor, and the registers as now described may all be in a single portion of the microprocessor depending upon circuit design.

The algorithm or function F is stored in a function register 34, and the key number Kn is stored in a key number register 36. As shown in the drawing, these are connected by buses 38 and 40, respectively, to the microprocessor 28, which in turn is connected to the switch 26. The purpose here is to ensure that the function F and key number Kn are invisible at the contacts 14 and cannot in normal use and operation of the prepaid card be read out at the contacts 14.

The certificate is calculated in the microprocessor 28 and may be stored in a certificate register 42. The certificate is passed to the contacts 14 in reply to an interrogation, and under control of the switch and microprocessor.

The random number Rdn received from the SIM, may be stored in a random number register 46 shown connected to the microprocessor by bus 48. The recalculated certificate with the random number may be stored in the certificate register 42, and is transferred as needed to the contacts 14.

With regard to the various elements shown in FIG. 2 as being on the integrated circuit, it will be appreciated that the switch, microprocessor, and several registers may be all contained within a single chip. Also the element may not be allocated to unique space within the IC memory, for example, the various numbers in the registers may be moved around under the control of the microprocessor. This would be in accordance with the design of the particular IC chip.

The important point is that the serial number, number of prepaid units remaining, and certificate can be read from outside the prepaid card through the contacts 14. The function F and the key number Kn can normally not be interrogated from the contacts 14. supervisory controls, not shown, may be included in the integrated circuit to permit such an interrogation based upon a higher level of security than what is shown.

The serial number, function, and key number may be written into the integrated circuit at time of manufacture, or subsequent to manufacture. Any convenient or conventional type of circuit and method for the entry of such data may be used.

Turning now to FIG. 3, there is shown the SIM arranged on the smart card 8 with the contacts 18 and an integrated circuit 20.

The contacts 18 are connected by a bus 54 to the a switch 56 and the switch is connected to a microprocessor 58.

A serial number register 60, a prepaid number of units remaining register 62, and a certificate register 64, are connected to the switch 56 by buses 66, 68 and 70, respectively, and receive and store the serial number, remaining number of prepaid units, and certificate number as received from the prepaid card through the contacts 18 and the switch 56, and under the control of the microprocessor 58. The switch 56 and the microprocessor 58 may be one and the same unit, although the microprocessor controls the switching function.

The function or algorithm F is stored in a F function register 72; the G function or algorithm is stored in a G function register 74; and the diversification key Kd is stored in a diversification key register 76. These three registers are shown connected by buses 78, 80 and 82, respectively to the microprocessor only because they cannot normally be read out from the SIM at the contacts 18. The key number Kn is computed by the SIM as a function of the G function operating on the serial number and the diversification key, and the key number is stored in a key number register 84. A Random number generator 85 generates a random number, Rnd, on a bus 87 connected to microprocessor 58. The microprocessor then calculates a certificate from the key number stored in the register 84, the F function stored in the F function register 72, the serial number in register 60; and number of units remaining in register 62. The calculated certificate is then stored in a register 86.

Comparison between the certificate calculated by the SIM in register 86 and the certificate received from the prepaid card in register 64 is performed in the microprocessor 58. Alternatively, it could be performed in a separate counter (not shown).

Tariff data as received from the network operator is stored in a memory 88 connected to the microprocessor 58 by a bus 90. The data comes via the handset antenna 11 and is downloaded through the contacts 18.

An alternative to countdown with the clock is to use pulses received from the network. In such an arrangement, during the course of a conversation, a pulse or other signal representative of unit of cost is transmitted from the network to the telephone; and in accordance with those received pulses, the prepaid units are removed from the prepaid card. In the GSM 11.11 standard, this is sometimes referred to as the "E parameter". It has seven variables, and is called an advice of charge protocol, AOC.

A clock and power supply is shown in FIG. 3 as being on the SIM chip. This is used for calculation of costs for a call made, and for generating with the microprocessor a signal or pulse to the prepaid card for decrementing the number of units remaining in the prepaid card register 32 in FIG. 2.

It should be understood that the clock 92 and the power supply 94 may be contained off the SIM and may be included in the handset. This is shown by the dotted line 96. Also, the SIM 8 need not be on a smart card, but may be permanently attached in handset.

Typically, the two functions F and G and the diversification key Kd will be entered in the SIMs integrated circuit during manufacture. However, depending upon the manufacturing technique and the preferences of network operators, some or all of those items may be entered at a later stage of manufacture, e.g. after the IC is tested, and before insertion in the card, or after insertion in the card, or after the card has been inserted in the network. Suitable security checks will be needed to install the two functions and particularly the diversification key so that it cannot be read from the registers.

As used in this application, the contacts 14 and 18 are described as physical contacts on a surface of the card and in one embodiment are in accordance with the ISO standard. An alternative type of contact is that of a loop in which there is not a touching electrical contact with corresponding contacts inside the handset, but the contact is made electromagnetically through a coil in the card and in the handset. As the nature of contacts may develop over the life of this patent, the term contacts as used herein and in the claims, covers all types of contacts which may be used to establish a connection, i.e. a transfer of data between the integrated circuit on the prepaid card, and the handset, and the integrated circuit in the SIM.

The present invention has been described with particular reference to a wireless or cellular telephone. The method, apparatus, integrated circuits and prepaid cards and SIMs of the invention are not so limited and may find other applications; for example, in subscriber pay-television, remote vending, electronic purse, reloading a pre-paid smart card.

It will be apparent, therefore, that the illustrative embodiments described are only examples and that various modificaions can be made in the construction, method and arrangement within the scope of the invention as defined in the appended claims.

What is claimed:

1. A method for enabling service from a wireless telephone having a Subscriber Identification Module (SIM) and a prepaid card in the telephone comprising the steps of:
   (a) calculating in the card a certificate as a function of
      (i) number of prepaid units remaining in the card,
      (ii) serial number in the card, and
      (iii) a key number in the card;
   (b) transferring from the card to the SIM
      (i) said number of prepaid units remaining in the card, and
      (ii) the card's serial number;
   (c) calculating in the SIM a number which should be the same as the card key number based on said transferred number of prepaid units remaining in the card and said card serial number;
   (d) calculating in the SIM a certificate as a function of said transferred number of prepaid units remaining in the card and said calculated number which should be the same as said key number in the card;

(e) comparing said calculated certificates from said card and from said SIM; and (f) if coincident in said comparison then enabling said telephone in a wireless network.

2. The method of claim 1, wherein said calculations of said certificates in said card in step (a) and in said SIM in step (d) use the same algorithm.

3. The method of claim 1, wherein said calculation in step (c) of said number which should be the same as said card key number, uses a diversification key which is the same in a plurality of wireless telephones serviced by one network operator.

4. The method of claim 1 or 3, wherein said key number comprises a first sequence which is unique for each card, and a second sequence which is common to a plurality of cards and unique for each network operator.

5. The method of claim 1 or 2, wherein one of said calculations of said certificates and said calculation of said key number which should be the same as the card key number employ different algorithms.

6. The method of claim 1, further comprising the steps of (g) storing rate information in the telephone;

(h) measuring time usage after said telephone is enabled in the network and said telephone is placed in use for measuring time said telephone is in such use; and (i) decreasing the number of remaining prepaid units in said card in accordance with the rate information and said time usage of the telephone.

7. The method of claim 6, wherein said decreasing step generates a periodic signal, with a period of said periodic signals corresponding to a prepaid unit, and said period is a function of said telephone rate information stored in said telephone, and a function of a type of service selected by a user of the telephone.

8. The method of claim 1 wherein said SIM generates a random number, transferring said random number to said prepaid card, and wherein said certificates calculated in said card and in said SIM each include as a function thereof said random number.

9. The method of claim 6, wherein said storing is in said SIM, and further comprising the step of modifying said rate information in said SIM by incoming wireless transmission from said network.

10. The method of claim 1, wherein said enabling signal changes said telephone from a restricted mode of use to a less restricted mode of use.

11. The method of claim 6 or 7 comprising in said decreasing the number of remaining prepaid units in said card further comprises steps of (j) generating a random number in said SIM;

(k) transferring said random number to said card;

(l) recalculating said certificate in said card as a function of
number of units now remaining in the card,
said serial number of the card,
said key number of the card, and
said random number;

(m) recalculating a certificate in said SIM as a function of
said number of units now remaining in the card,
said serial number of the card,
said key number of the card, and
said random number;

(n) comparing said recalculated certificates and if non-coincidence then (o) disabling said telephone from said network.

12. The method of claim 11, comprising the steps of repeating said steps (j)–(n) for each unit decreased from said card.

13. The method of claim 11, wherein said recalculating in said SIM comprises two sub-steps, first generating in the SIM a card key number based on said transferred number of units remaining in the card and the serial number of the card which generated number should be the same as the key number in the card, and second calculating in the SIM from said just generated card key number, and from said random number, and from said number of units now remaining in the card, said recalculated certificate.

14. An apparatus for enabling service from a wireless telephone having a Subscriber Indentification Module (SIM) and a prepaid card in said telephone comprising:

(a) means for calculating in the card a certificate as a function of
(i) number of prepaid units remaining in the card,
(ii) serial number in the card, and
(iii) a key number in the card;

(b) means for transferring from the card to the SIM
(i) said number of prepaid units remaining in the card, and
(ii) the card's serial number;

(c) means for calculating in the SIM a number which should be the same as the card key number based on said transferred number of prepaid units remaining in the card and said card serial number; and (d) for calculating in the SIM a certificate as a function of said transferred number of prepaid units remaining in the card and said calculated number which should be the same as said key number in the card (e) means for comparing said calculated certificates from said card and from said SIM, and if coincident in said comparison then enabling said telephone in a wireless network.

15. The apparatus of claim 14, wherein said means for calculations of said certificates in said card and in said SIM use the same algorithm.

16. The apparatus of claim 15, wherein said means for calculation of said number which should be the same as said card key number comprises a diversification key which is the same in a plurality of wireless telephones serviced by one network operator.

17. The apparatus of claim 14 or 16, wherein said key number comprises a first sequence which is unique for each card, and a second sequence which is common to a plurality of said cards and unique for each network operator.

18. The apparatus of claim 14, further comprising
means for storing rate information in the telephone,
means for timing said telephone when in use, and
means for decreasing the number of remaining prepaid units in said card after said telephone is enabled in the network and said telephone is in use, in accordance with the stored rate information, and time duration of telephone use.

19. The apparatus of claim 14, further comprising
means for storing rate information in the telephone,
means for generating a periodic signal, wherein a period of said periodic signals corresponds to one of said prepaid units, and said period is a function of said telephone rate information stored in said telephone and time duration of usage of said telephone when enabled, and means for decreasing the number of remaining prepaid units in said card in accordance with said period.

20. The apparatus of claim 18 or 19, comprising means for modifying said stored rate information upon receipt of incoming wireless transmission of rate information from said network.

21. The apparatus of claim 18 comprising
(a) means for generating a random number in said SIM;
(b) means for transferring said random number to said card;
    said means for calculating in said card including means for recalculating said certificate in said card as a function of
    number of units now remaining in the card,
    said serial number of the card,
    said key number of the card, and
    said random number;
(d) said means for calculating a certificate in said SIM including means for recalculating a certificate as a function of
    said number of units now remaining in the card,
    said serial number of the card,
    said calculated key number of the card, and
    said random number;
(e) said means for comparing including means for comparing said recalculated certificates and if non-coincidence then disabling said telephone from said network.

22. A subscriber identification module for operating with prepaid cards and with a wireless telephone network that provides goods/services via said wireless telephone network comprising:
    an integrated circuit having,
    (a) an input for receiving from one prepaid card
        (i) a serial number of said card,
        (ii) a number of prepaid units remaining in said card, and
        (iii) a certificate compiled by said card from its serial number, card key number, algorithm, and number of prepaid units remaining in said card;
    (b) a diversification key which is the same for a plurality of subscriber identification modules of said wireless telephone network;
    (c) first and second algorithms;
    (d) a microprocessor for calculating
        (i) a card key number with said first algorithm as a function of said diversification key, and said receive serial number of said card, and where said calculated card key number should be the same as said key number in said card; and
        (ii) calculating a certificate with said second algorithm as a function of said calculated card key number, and said receive number of prepaid units remaining in said card; and
        (iii) comparing said calculated certificate with said received certificate, and
        (iv) if coincidence, generating an enable signal whereby goods/services are provided in accordance with said generated enable signal.

23. A The module according to claim 22 further comprising
    (a) a clock input;
    (b) a register for receiving and storing time/tariff rates of the goods/services provided via the network;
    (c) an output for sending signals to said prepaid card;
    (d) said microprocessor calculating cost of a unit of goods/services as a function of
        (i) time elapsed via said clock input, and
        (ii) the rates stored in said register, and
    (e) in accordance with said calculations generating a signal on said output, representing consumption of a prepaid unit,
        whereby said output signal decreases the number of prepaid units in said card.

24. The module according to claim 22, wherein said diversification key is the same for a plurality of modules and is unique to a network, and said card key comprises a portion which is unique for each card and another portion which is unique to a network.

25. A device according to any one of claims 14, or 22 wherein said SIM generates a random number and transfers said random to said prepaid card and said calculations of said certificates comprise said random number as an additional variable.

26. The apparatus according to claim 18, wherein said stored rate information is selected from the group consisting of a table look-up and a formula.

* * * * *